United States Patent [19]

Matsumura et al.

[11] Patent Number: 5,450,376
[45] Date of Patent: Sep. 12, 1995

[54] OPTICAL INFORMATION RECORDING/REPRODUCTION APPARATUS WITH SUPER-RESOLUTION OPTICAL FILTER

[75] Inventors: Susumu Matsumura, Kawaguchi; Hiroaki Hoshi, Yokohama; Masakuni Yamamoto, Yamato; Eiji Yamaguchi, Zama, all of Japan

[73] Assignee: Canon Kabushiki Kaisha, Tokyo, Japan

[21] Appl. No.: 46,719

[22] Filed: Apr. 16, 1993

[30] Foreign Application Priority Data

Apr. 20, 1992 [JP] Japan .................................. 4-125401

[51] Int. Cl.⁶ ............................................ G11B 13/04
[52] U.S. Cl. ......................... 369/13; 369/44.14; 369/44.38; 369/110
[58] Field of Search ................. 369/13, 122, 100, 109, 369/111, 116, 121, 54, 58, 44.11, 44.39, 112, 110, 124, 59, 44.26, 44.28, 44.23, 44.24, 44.14, 44.38; 360/59, 114; 365/122

[56] References Cited

U.S. PATENT DOCUMENTS

| | | | |
|---|---|---|---|
| 4,517,667 | 5/1985 | Sprague | 369/122 |
| 4,583,210 | 4/1986 | Winslow | 369/54 |
| 5,043,960 | 8/1991 | Nakao et al. | 369/13 |
| 5,107,472 | 4/1992 | Fujiwara et al. | 369/13 |

FOREIGN PATENT DOCUMENTS 52-3405  1/1977  Japan .
3-086955  4/1991  Japan .

OTHER PUBLICATIONS

Yamanaka, et al., "High Density Optical Recording by Superresolution," *Proc. Int. Symp. on Optical Memory, 1989, Japanese Journal of Applied Physics*, vol. 28 (1989) Supplement 28-3, pp. 197–200.

*Primary Examiner*—Ali Neyzari
*Attorney, Agent, or Firm*—Fitzpatrick, Cella, Harper & Scinto

[57] ABSTRACT

An optical information recording/reproducing apparatus realizes a direct verifying operation with a simple structure. A light beam emitted from a light source is converged on a track provided on an optical recording medium which is adapted to be moved relatively to the light beam. A super-resolution optical filter is provided in an optical path between the light source and the recording medium. The optical filter functions to produce a first light spot and a second light spot to be irradiated on the track such that the light intensity of the second light spot is lower than that of the first light spot and a recording signal is recorded using the first light spot. The signal recorded on the recording medium using the first light spot is reproduced by use of the reflected light caused upon the irradiation of the second light spot on the recording medium.

33 Claims, 7 Drawing Sheets

OPTICAL INFORMATION RECORDING/REPRODUCTION APPARATUS WITH SUPER-RESOLUTION OPTICAL FILTER

BACKGROUND OF THE INVENTION

1. Field of the Invention

The present invention relates to an optical information recording/reproduction apparatus and, more particularly, to optical information recording/reproduction apparatus capable of recording a signal and simultaneously verifying the recorded signal, i.e., capable of executing a so-called direct verify operation.

2. Related Background Art

Since an information recording/reproduction apparatus using an optical information recording medium such as an optical disk generally has advantages such as a removable recording medium, a high density, a large capacity, and the like, it is utilized in various fields. In recent years, a magnetooptical recording/reproduction apparatus for magnetooptically recording/reproducing information onto/from a magnetooptical recording medium has received a lot of attention. Such an apparatus is put into practical applications, e.g., an external storage apparatus of a computer, a document file recording/reproduction apparatus, and the like since it can rewrite information. In magnetooptical recording apparatuses, in order to further increase the data throughput, extensive studies about an over-write method, a direct verify method, and a high-density recording method which can achieve both the two methods have been made.

Conventionally, various direct verify methods have been proposed. For example, as shown in FIG. 1, a method of sequentially scanning a first light spot 113 and a second light spot 114 on an information track 116 on a recording medium is known. More specifically, the preceding first light spot 113 records an information pit 115 corresponding to data to be recorded, and the next second light spot 114 reproduces the information pit 115 to check if information is correctly recorded. According to this direct verify method, since recording and verify of information can be performed in one revolution of an information recording disk, the data throughput can be greatly increased. However, in order to simultaneously perform recording and verify, two light spots are required. In order to form the two light spots, a method using a plurality of lasers as light sources, as disclosed in, e.g., Japanese Laid-Open Patent Application No. 52-3405 or U.S. Pat. No. 4,583,210, and a method using a semiconductor laser array as a light source, as proposed in U.S. Pat. No. 4,517,667 are known. In these conventional verify methods, after recorded data is fixed (a recording state is stabilized), it is detected if the recorded data is normally recorded.

Contrary to these methods, in recent years, for example, Japanese Laid-Open Patent Application No. 3-86955 proposes a method to be called a simplified pseudo direct verify method. This method will be briefly described below. FIG. 2 is a schematic diagram of a magnetooptical recording/reproduction apparatus described in Japanese Laid-Open Patent Application No. 3-86955. In this example, a single light beam modulated according to a recording signal is emitted from a semiconductor laser in an optical pickup 124. The light beam reflected by a magnetooptical disk 121 is received, and is compared with the recording signal by a comparator 125, thereby detecting whether or not data recording is normally performed.

However, in the conventional method of performing a verify operation using the two light spots, the construction of the optical head is complicated, and alignment between the two light beams requires a troublesome operation. When the two light spots are separated excessively away from each other, one light spot is deformed by an aberration generated due to insufficient performance outside the optical axis of an objective lens. For this reason, reproduced signal quality is degraded, and reliability of a verify operation is impaired. On the other hand, in the pseudo verify method using one beam, although the optical system has a simple construction, since unerased, i.e., previously recorded old information remains on a leading portion of the light spot, an information component to be written and a previously written old information component are mixed in a verify signal, thus impairing reliability of a verify operation.

SUMMARY OF THE INVENTION

It is an object of the present invention to provide an optical information recording/reproduction apparatus, which can solve the conventional problems, and can reliably execute a direct verify operation with a simple construction.

In order to achieve the above object, an optical information recording/reproduction apparatus according to a first aspect of the present invention, comprises:
  a light source for emitting a light beam;
  a lens for converging the light beam emitted from the light source onto a track provided on an optical recording medium, which is moved relative to the light beam;
  a super-resolution optical filter, arranged in an optical path extending from the light source to the medium, for forming, from the light beam, a first light spot radiated onto the track, and a second light spot, which is formed to be juxtaposed with the first light spot in a longitudinal direction of the track and has an intensity lower than an intensity of the first light spot, a signal being recorded on the track by the first light spot; and
  reproduction means for reproducing the signal recorded on the track using the first light spot, from reflected light of the second light spot by the medium.

An optical information recording/reproduction apparatus according to a second aspect of the present invention, comprises:
  a light source for emitting a light beam;
  a lens for converging the light beam emitted from the light source onto a track provided on an optical recording medium, which is moved relative to the light beam;
  a super-resolution optical filter, arranged in an optical path extending from the light source to the medium, for forming, from the light beam, a first light spot radiated onto the track, and a second light spot, which is formed to be juxtaposed with the first light spot in a longitudinal direction of the track and has an intensity lower than an intensity of the first light spot;
  a magnetic head for applying a magnetic field modulated according to a recording signal onto a portion, irradiated with the first light spot, of the medium; and reproduction means for reproducing the recording signal recorded on the track using the first light spot, from reflected light of the second light spot by the medium.

A method of performing recording and reproduction using an apparatus of the second aspect, comprises the steps of:

moving the first and second light spots relative to the medium in the longitudinal direction of the track;

recording a signal on the track by applying a magnetic field modulated according to a recording signal by the magnetic head onto a portion, irradiated with the first light spot, of the medium; and reproducing the signal recorded on the track using the first light spot from an output from the photodetector.

An optical information recording/reproduction apparatus according to a third aspect of the present invention, comprises:

a light source for emitting a light beam;

a lens for converging the light beam emitted from the light source onto a track provided on an optical recording medium, which is moved relative to the light beam;

a super-resolution optical filter, arranged in an optical path extending from the light source to the medium, for forming, from the light beam, a first light spot radiated onto the track, and a second light spot, which is formed to be juxtaposed with the first light spot in a longitudinal direction of the track and has an intensity lower than an intensity of the first light spot;

a magnetic head for applying a magnetic field modulated according to a recording signal onto a portion, irradiated with the first light spot, of the medium;

a beam splitter for splitting reflected light components of the first and second light spots by the medium into first and second light beams;

first photodetection means for receiving the first light beam;

a first mask, arranged in an optical path extending from the beam splitter to the first photodetection means, for shielding reflected light of the second light spot so as not to cause the light to be incident on the first photodetection means;

second photodetection means for receiving the second light beam; and a second mask, arranged in an optical path extending from the beam splitter to the second photodetection means, for shielding reflected light of the first light spot so as not to cause the light to be incident on the second photodetection means.

An optical information recording/reproduction apparatus according to a fourth aspect of the present invention, comprises:

a light source for emitting a light beam;

a lens for converging the light beam emitted from the light source onto a track provided on an optical recording medium, which is moved relative to the light beam;

a super-resolution optical filter, arranged in an optical path extending from the light source to the medium, for forming, from the light beam, a first light spot radiated onto the track, and a second light spot, which is formed to be juxtaposed with the first light spot in a longitudinal direction of the track and has an intensity lower than an intensity of the first light spot;

a magnetic head for applying a magnetic field modulated according to a recording signal onto a portion, irradiated with the first light spot, of the medium; and first and second photodetection means for respectively receiving reflected light components of the first and second light spots by the medium.

DESCRIPTION OF THE PREFERRED EMBODIMENTS

Figure 1:
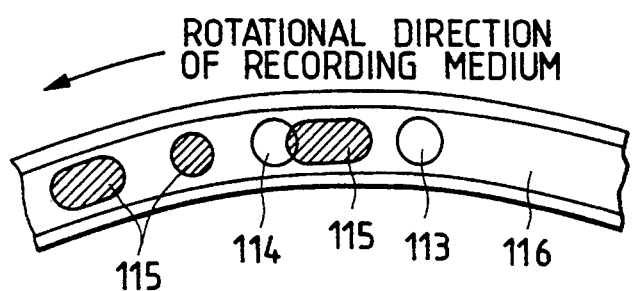
FIG. 1 is a schematic view for explaining a conventional direct verify operation.
Figure 2:
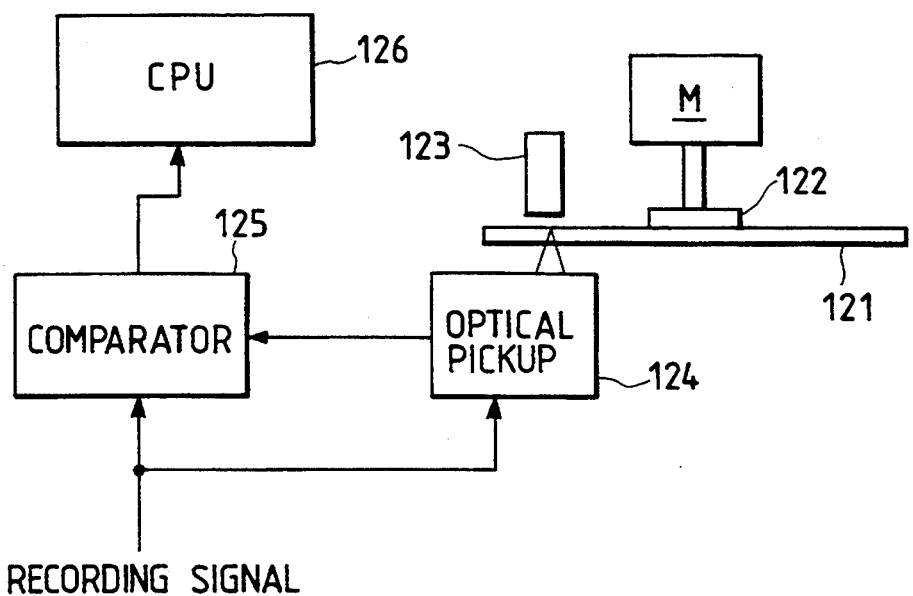
FIG. 2 is a schematic diagram showing a construction of a conventional optical information recording/reproduction apparatus.
Figure 3:
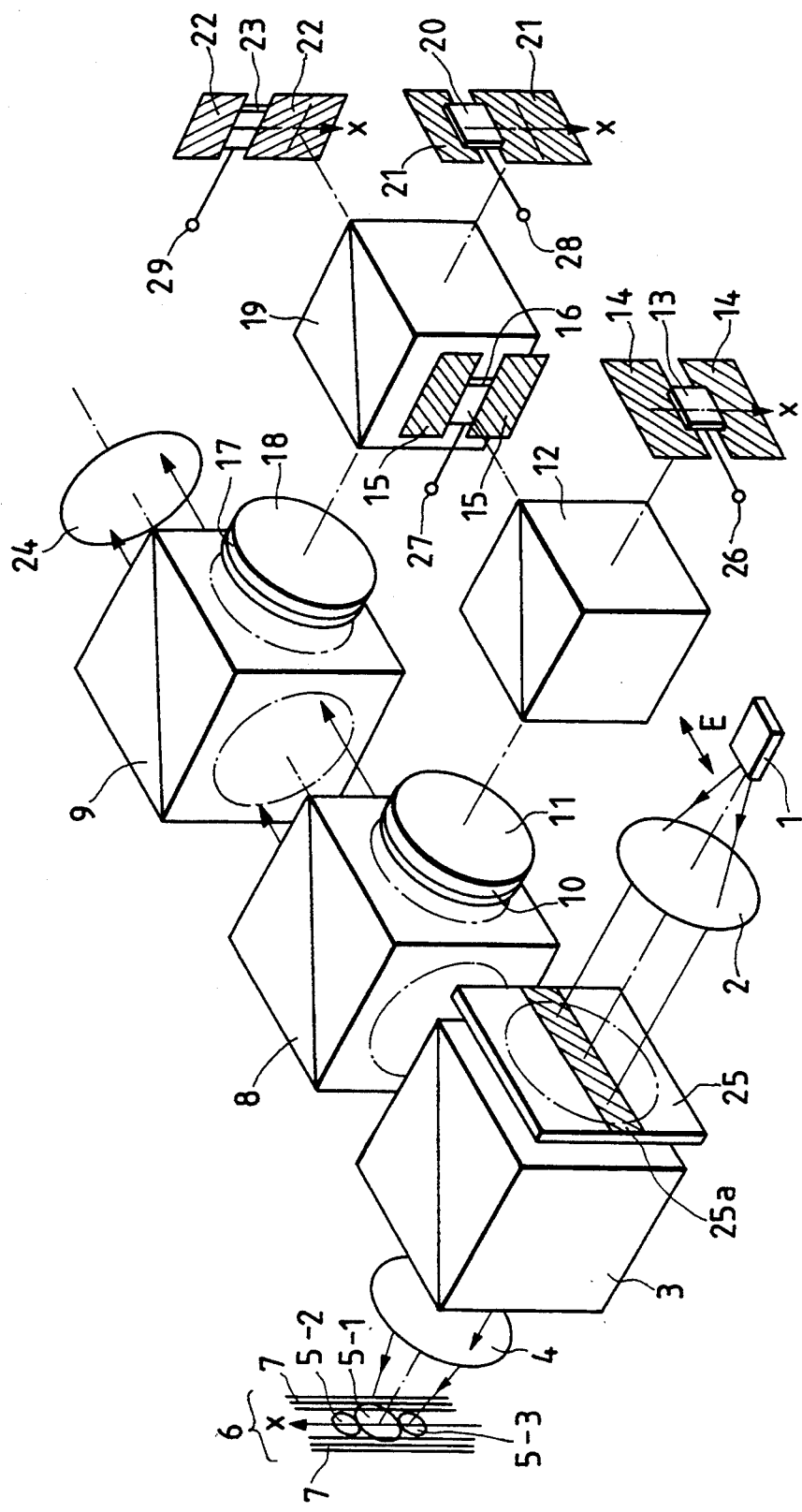
FIG. 3 is a schematic perspective view showing an optical information recording/reproduction apparatus according to the first embodiment of the present invention.

FIG. 3 is a perspective view showing a construction of an optical system as a main part of an optical information recording/reproduction apparatus according to the first embodiment of the present invention. The optical system shown in FIG. 3 includes a semiconductor laser 1 arranged as an information recording/reproduction light source, and a collimator lens 2 for collimating a divergent light beam emitted from the semiconductor laser 1. The laser beam emitted from the semiconductor laser 1 is linearly polarized light having a wavelength $\lambda$ of 830 nm. In FIG. 3, the electric field vector direction of this linearly polarized light is indicated by a double-headed arrow E (this polarized light will be referred to as p-polarized light hereinafter). The optical system also includes a first polarizing beam splitter 3 for transmitting most of the linearly polarized light components indicated by the arrow E, and reflecting 100% of polarized light components (to be referred to as s-polarized light hereinafter) in a direction perpendicular to the p-polarized light, and an objective lens 4 for converging the laser light beam transmitted through the polarizing beam splitter 3 to form a small light spot on an information recording medium. As the information recording medium, a magnetooptical disk is used, and an information track 6 shown in FIG. 3 corresponds to one of a plurality of information tracks of this disk. A super-resolution optical filter 25 is arranged between the collimator lens 2 and the first polarizing beam splitter 3. The optical filter 25 is formed with a band-like light-shielding portion 25a extending in a direction perpendicular to the information track. The optical filter 25 operates to change the light intensity distribution of the parallel light beam, and forms three light spots 5-1 to 5-3 on the information track 6, as shown in FIG. 3. More specifically, as will be described later, the optical filter changes the light intensity distribution to that having three peaks in place of a normal Gaussian light intensity distribution, thereby forming three light spots on the information track 6. Note that grooves 7 for guiding the light spots are formed on two sides of the information track 6.

The optical system further includes a normal beam splitter 8 for splitting an incident light beam into transmission light and reflected light, a second polarizing beam splitter 9 for reflecting 100% of s-polarized light components, and reflecting some of p-polarized light components, a transmission wave surface 24, a half-wave plate 10 for rotating the direction of polarization of the reflected light from the beam splitter 8 through 45°, an imaging lens 11 for forming an optical image of the light beam on photoelectric conversion elements 13 and 16, and a third polarizing beam splitter 12 for reflecting 100% of s-polarized light components, and transmitting 100% of p-polarized light components. Based on the polarization characteristics of the beam splitter 12, the p-polarized light components split by the beam splitter 12 are guided toward the photoelectric conversion element 13, and the s-polarized light components are guided toward the photoelectric conversion element 16. Light-shielding masks 14 and 15 are arranged on the front surfaces of the photoelectric conversion elements 13 and 16. Each of the light-shielding masks 14 and 15 is formed with a slit-like aperture so as to cut images of reflected light components of the light spots 5-2 and 5-3, and to allow only an image of reflected light of the light spot 5-1 to pass therethrough. The above-mentioned optical elements from the beam splitter 8 to the photoelectric conversion elements 13 and 16 constitute a first reproduction optical system. The first reproduction optical system is used for generating a reproduction signal of recorded information in a normal information reproduction mode. The optical system further includes a half-wave plate 17 provided to the second polarizing beam splitter 9 side, an imaging lens 18, a fourth polarizing beam splitter 19, and photoelectric conversion elements 20 and 23. The fourth polarizing beam splitter 19 reflects 100% of s-polarized light components, and transmits 100% of p-polarized light components as in the third polarizing beam splitter 12. Therefore, the s-polarized light components are guided to the photoelectric conversion element 23, and the p-polarized light components are guided to the photoelectric conversion element 20. Light-shielding masks 21 and 22 are respectively provided to the front surfaces of the photoelectric conversion elements 20 and 23. Each of the light-shielding masks 21 and 22 is formed with a slit-like aperture so as to cut images of reflected light components of the light spots 5-1 and 5-2, and to allow only an image of reflected light of the light spot 5-3 to pass therethrough. The optical elements from the second polarizing beam splitter 9 to the photoelectric conversion elements 20 and 23 constitute a second reproduction optical system. As will be described in detail later, the second reproduction optical system is used for generating a verify reproduction signal for a direct verify operation in an information recording mode.

Figure 4:
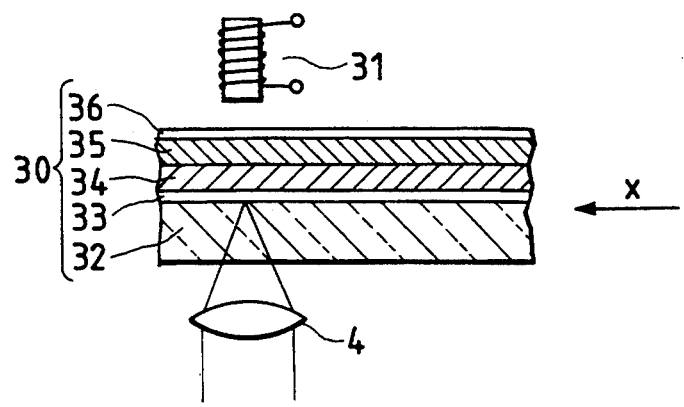
FIG. 4 is a schematic sectional view showing the structure of a magnetooptical recording medium used in the first embodiment.
Figure 5:
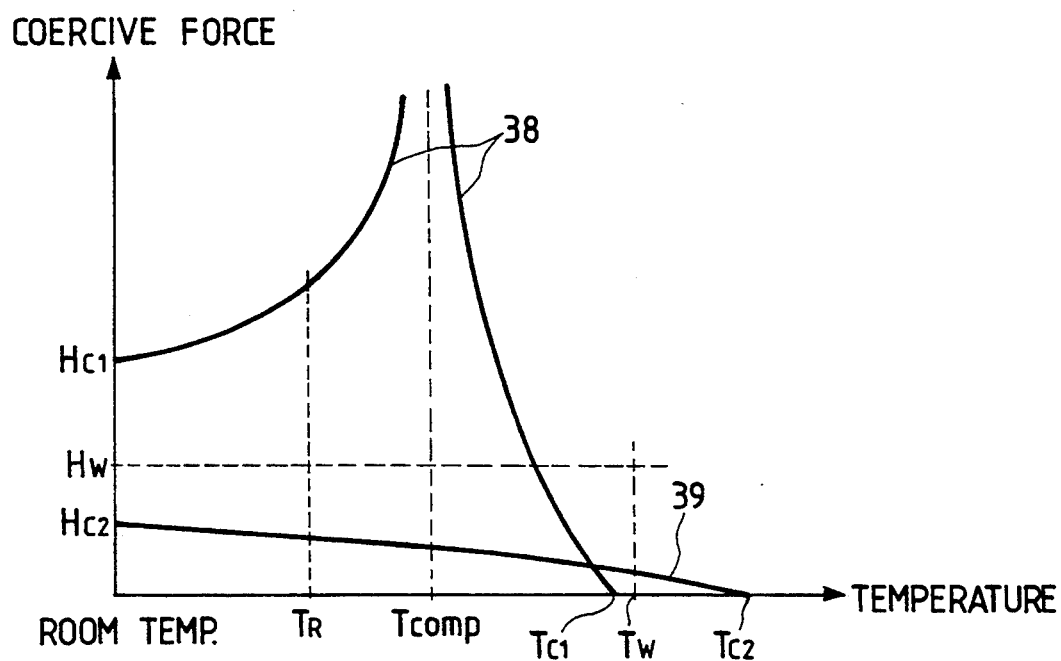
FIG. 5 is a graph showing the characteristics of magnetic layers of the medium shown in FIG. 4.

FIG. 4 is a sectional view showing a layered structure of the magnetooptical disk used as an information recording medium. In FIG. 4, a magnetooptical disk 30 has a transparent substrate 32 consisting of, e.g., a glass or plastic plate. A protection and interference layer 33, a reproduction layer 34, and a recording layer 35 are sequentially stacked on the upper surface of the transparent substrate 32, and a protection layer 36 is formed on the upper surface of the recording layer 35. The reproduction layer 34 and the recording layer 35 comprise magnetic films, which are exchange-coupled to each other, and consist of, e.g., TbFeCo. Although not shown in FIG. 3, a magnetic head 31 is arranged to oppose the objective lens 4 to sandwich the magnetooptical disk 30 therebetween. The magnetic head 31 generates a magnetic field modulated according to an information signal to be recorded, and applies the modulated field as a recording magnetic field onto the magnetooptical disk 30. FIG. 5 is a graph showing the characteristics of coercive forces of the recording layer 35 and the reproduction layer 34 with respect to the temperature. In FIG. 5, a curve 38 represents the characteristics of the recording layer 35, and a curve 39 represents the characteristics of the reproduction layer 34. As is apparent from FIG. 5, the recording layer 35 has a large coercive force $H_{C1}$ at room temperature, and a low Curie temperature $T_{C1}$. Contrary to this, the reproduction layer 34 has a small coercive force $H_{C2}$ at room temperature, and a high Curie temperature $T_{C2}$. Note that $T_{comp}$ represents the compensation temperature of the recording layer 35, $H_W$ represents the strength of the magnetic field generated by the magnetic head 31, $T_R$ represents the heating temperature by the light spot in the reproduction mode, and $T_W$ representing the heating temperature by the light spot in the recording mode.

Figure 6A:
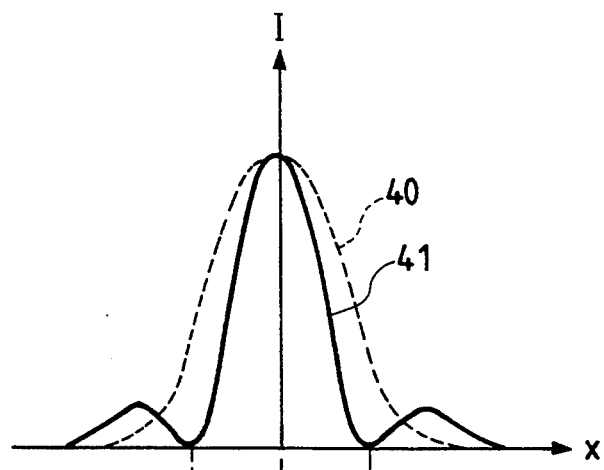
FIGS. 6A and 6B are schematic views showing spots formed on the medium.
Figure 6B:
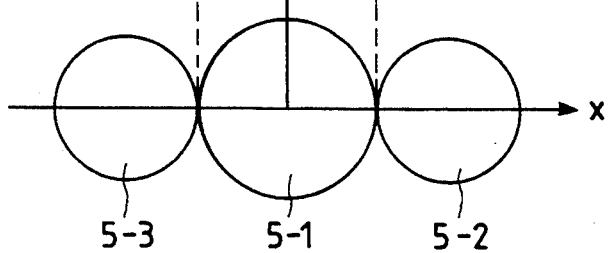

The operation of this embodiment will be described below. The general operation of the optical system shown in FIG. 3 will be described first. A laser beam emitted from the semiconductor laser 1 is collimated by the collimator lens 2, and is then incident on the objective lens 4 via the optical filter 25 and the first polarizing beam splitter 3. The objective lens 4 converges the laser beam by its focusing effect to form three light spots 5-1 to 5-3 on the information track 6. FIG. 6A shows the light intensity distribution of the light beam in a track direction (x-direction) on the information track 6 at that time. A distribution represented by a curve 41 corresponds to the light intensity distribution obtained by the super-resolution optical filter 25 of this embodiment. More specifically, since the complex transmittance distribution of the optical filter 25 exhibits a distribution known as a resolution improving filter, it has two peaks at two sides of the central peak, as indicated by the curve 41. Thus, as shown in FIG. 6B, the light spots 5-2 and 5-3 are formed by side lobes before and after the central super-resolution spot 5-1. The light spots 5-2 and 5-3 have a phase difference of $\pi$ from the central light spot 5-1. Note that a distribution represented by a curve 40 in FIG. 6A is a Gaussian distribution when no optical filter 25 is provided.

In this manner, the three light spots are formed at neighboring positions on the information track 6, and are scanned in an aligned state on the information track 6 upon rotation of the magnetooptical disk. The three light spots are reflected by the information track 6, and are incident on the first beam splitter 3 via the objective lens 4. The reflected light components include s-polarized light components perpendicular to the direction of the arrow E due to the magnetic Kerr effect of the magnetooptical recording film. These s-polarized light components are reflected by the first polarizing beam splitter 3, and are guided toward the beam splitter 8. Some of the original p-polarized light components are reflected by the first polarizing beam splitter 3, and are guided toward the beam splitter 8. The beam splitter 8 splits an incident light beam into two beams, and guides the transmission light beam toward the second polarizing beam splitter 9 and the reflected light beam toward the third polarizing beam splitter 12. Since the second polarizing beam splitter 9 reflects 100% of s-polarized light components and transmits some of the p-polarized light components, a light beam 24 transmitted through the second polarization beam splitter 9 consists of all p-polarized light components. These p-polarized light components are guided toward a control optical system (not shown), and are used for generating a servo error signal for auto-tracking control and auto-focus control. As an auto-focus control system in the control optical system, for example, a knife edge system is used, and as an auto-tracking control system, for example, a push-pull system is used.

On the other hand, the direction of polarization of the light beam reflected by the beam splitter 8 is rotated through 45° by the half-wave plate 10, and the light beam is then incident on the third polarizing beam splitter 12 via the imaging lens 11. Since the third polarizing beam splitter 12 reflects s-polarized light components and transmits p-polarized light components, the incident light beam is split into s-polarized light and p-polarized light, and optical images of the s-polarized light and the p-polarized light are formed on the photoelectric conversion elements 13 and 16. In this case, since the light-shielding masks 14 and 15 provided to the front surfaces of the photoelectric conversion elements 13 and 16 are formed with the apertures for cutting images of the light spots 5-2 and 5-3, and allowing only an image defined by the reflected light of the central light spot 5-1 to pass therethrough, only the image of the light spot 5-1 is formed on the photoelectric conversion elements 13 and 16. Detection signals 26 and 27 from the photoelectric conversion elements 13 and 16 are differentially detected by a differential amplifier (not shown), thus generating a reproduction signal corresponding to information recorded on the magnetooptical disk. The generated reproduction signal is used as a reproduction signal in the normal reproduction mode. On the other hand, the direction of polarization of the light beam reflected by the second polarization beam splitter 9 is rotated through 45° by the half-wave plate 17. Thereafter, the light beam is incident on the fourth polarizing beam splitter 19 via the imaging lens 18, and is split into s-polarized light and p-polarized light in the same manner as described above. These two different polarized light components form images on the photoelectric conversion elements 20 and 23 via the slit-like apertures of the light-shielding masks 21 and 22. In this case, since the light-shielding masks are formed with the slit-like apertures for cutting images defined by reflected light components of the light spots 5-1 and 5-2, the photoelectric conversion elements 20 and 23 detect only the reflected light of the light spot 5-3. Detection signals 28 and 29 from the photoelectric conversion elements 20 and 23 are differentially detected by a differential amplifier (to be described later), thus generating a reproduction signal.

Figure 7:
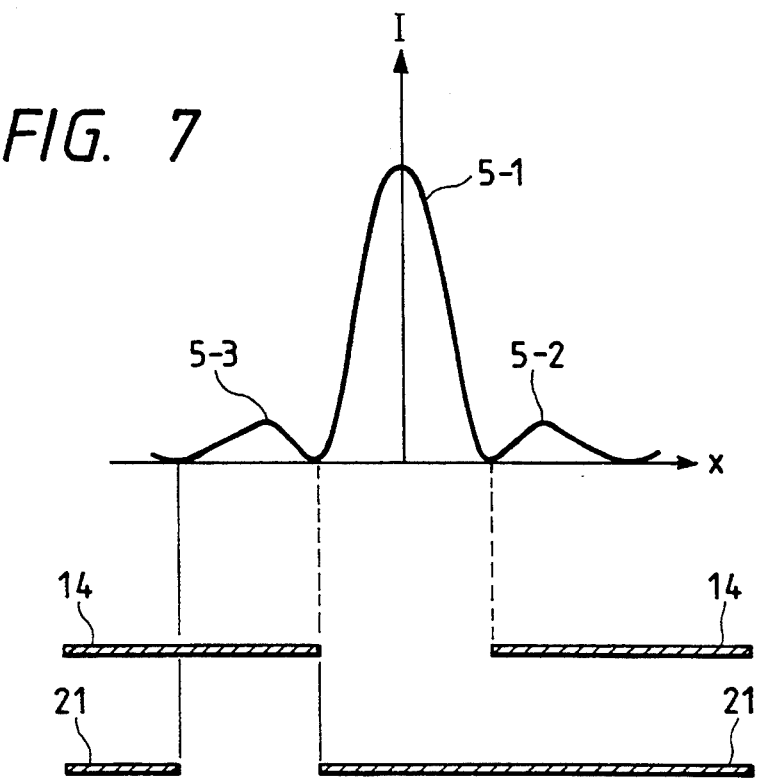
FIG. 7 is a schematic view showing the relationship between spots formed on the medium and a mask.

The generated reproduction signal is used as a verify reproduction signal for verifying whether or not information is normally recorded. The light-shielding masks are formed with the slit-like apertures, as described above, and allow only the necessary light spot to become incident on the photoelectric conversion elements. FIG. 7 shows the relationship between the light spots and the slit-like apertures. In FIG. 7, curve portions 5-1 to 5-3 represent the light amount distributions of the light spot formed by the imaging lens on the detection surface of the photoelectric conversion element, and x represents the track direction. As shown in FIG. 7, the light-shielding mask 14 in the first reproduction optical system is formed with the slit-like aperture in correspondence with the light amount distribution of the light spot 5-1 so as to allow only the light spot 5-1 to pass therethrough. A slit-like aperture is similarly formed on the other light-shielding mask 15 in the first reproduction optical system in correspondence with the light spot 5-1. In contrast to this, as shown in FIG. 7, the light-shielding mask 21 in the second reproduction optical system is formed with a slit-like aperture in correspondence with the light spot 5-3 so as to allow the light spot 5-3 to pass therethrough. The same applies to the other light-shielding mask 22 in the second reproduction optical system.

Figure 8:
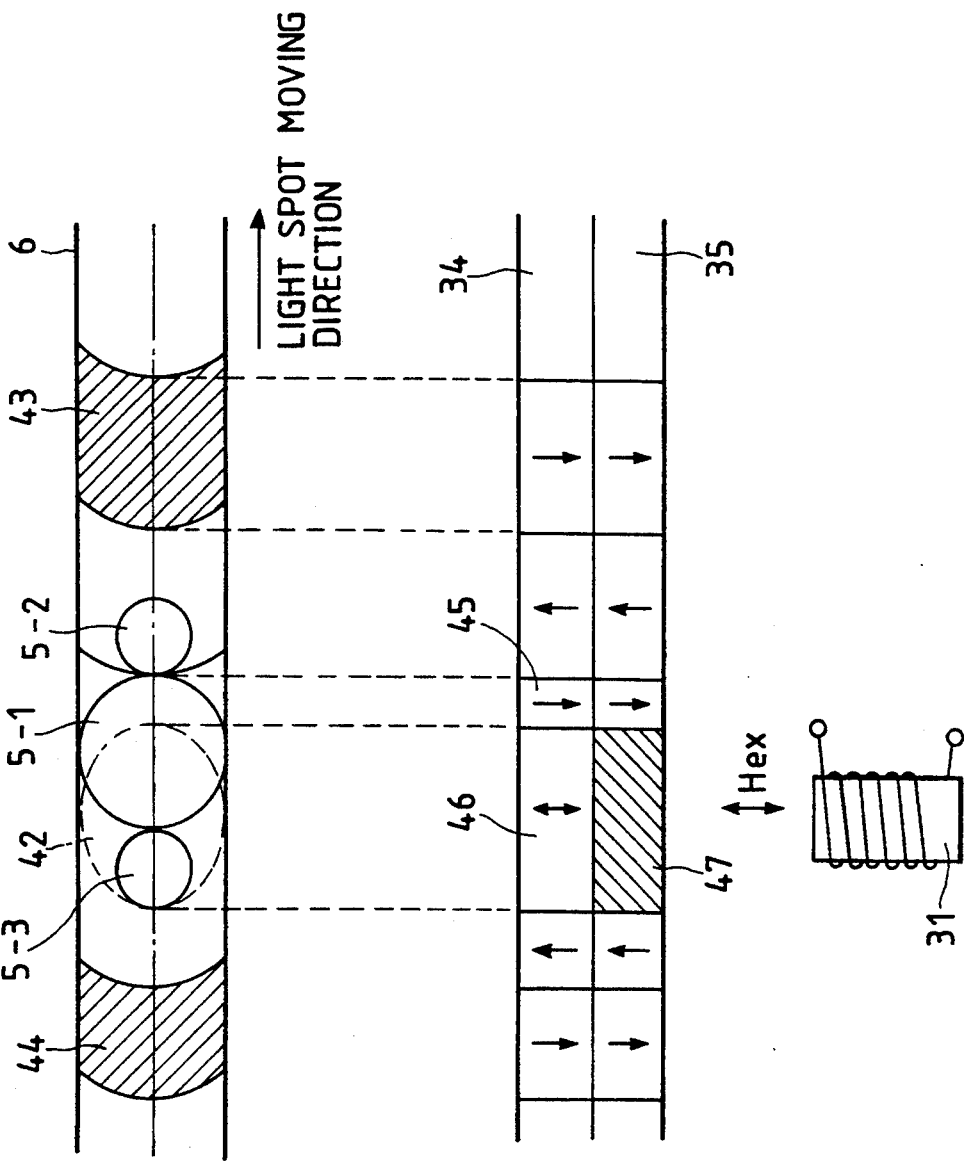
FIGS. 8A and 8B are schematic views for explaining a direct verify operation according to the first embodiment.

A detailed operation in the information recording mode will be described below. FIG. 8A shows the light spots and an information domain on the information track 6. In FIG. 8A, the light spots 5-1 to 5-3 are formed on the track upon operation of the super-resolution optical filter 25. When information is recorded, the light intensity of the semiconductor laser 1 is maintained to have a predetermined recording power, and upon radiation of this light spot, as shown in FIG. 8A, a heated area 42 is formed at a position slightly shifted backward from the light spot 5-1. The relationship between the temperature $T_W$ of this high-temperature area and the characteristics of the respective magnetic layers has already been described above with reference to FIG. 3. The light spot 5-1 and the heated area 42 do not coincide with each other since the light spot is being moved. FIG. 8B shows the magnetization state of the magnetic layers of the magnetooptical disk in this state. An area 47 of the recording layer 35 corresponding to the high-temperature area 42 is heated to a temperature near its Curie temperature, and magnetization has disappeared. Since the reproduction layer 34 has a higher Curie temperature than that of the recording layer 35, slight magnetization is present in the area 47 corresponding to the high-temperature area 42. In this state, the magnetic head 31 applies a magnetic field modulated according to an information signal, and the direction of magnetization of the reproduction layer 34 is oriented in the direction of the applied magnetic field. On the other hand, the light spots 5-1 to 5-3 are reflected by the medium surface of the information track 6. The reflected light components include a magnetooptical signal according to the direction of magnetization of the reproduction layer, and are reproduced as a verify reproduction signal by the second reproduction optical system, as described above. At this time, since the second reproduction optical system detects only the reflected light of the light spot 5-3, only the direction of magnetization in the heated area 42 is detected, as can be seen from FIGS. 6A and 6B. Therefore, mixing of an old information component on the information track 6 in the reproduction signal can be minimized. More specifically, when information is to be reproduced using the reflected light of the light spot 5-1, since the light spot 5-1 includes an area 45, which is not heated to a high temperature, the reproduction signal undesirably includes an old information component in the area 45. However, in this embodiment, since information is reproduced using the reflected light of the light spot 5-3 whose phase is delayed by $\pi$ from that of the light spot 5-1, mixing of the old information component can be minimized, and recorded information can be reproduced with high precision. The heated area 42 on the information track 6 is cooled after the light spots have passed, and upon cooling, the magnetization of the reproduction layer 34 is transferred to the recording layer 35. This magnetization state is fixed, and an information domain is recorded on the information track 6. FIG. 8A shows a currently recorded information domain 44, and an information domain 43 which has already been recorded on the information track 6.

Figure 9:
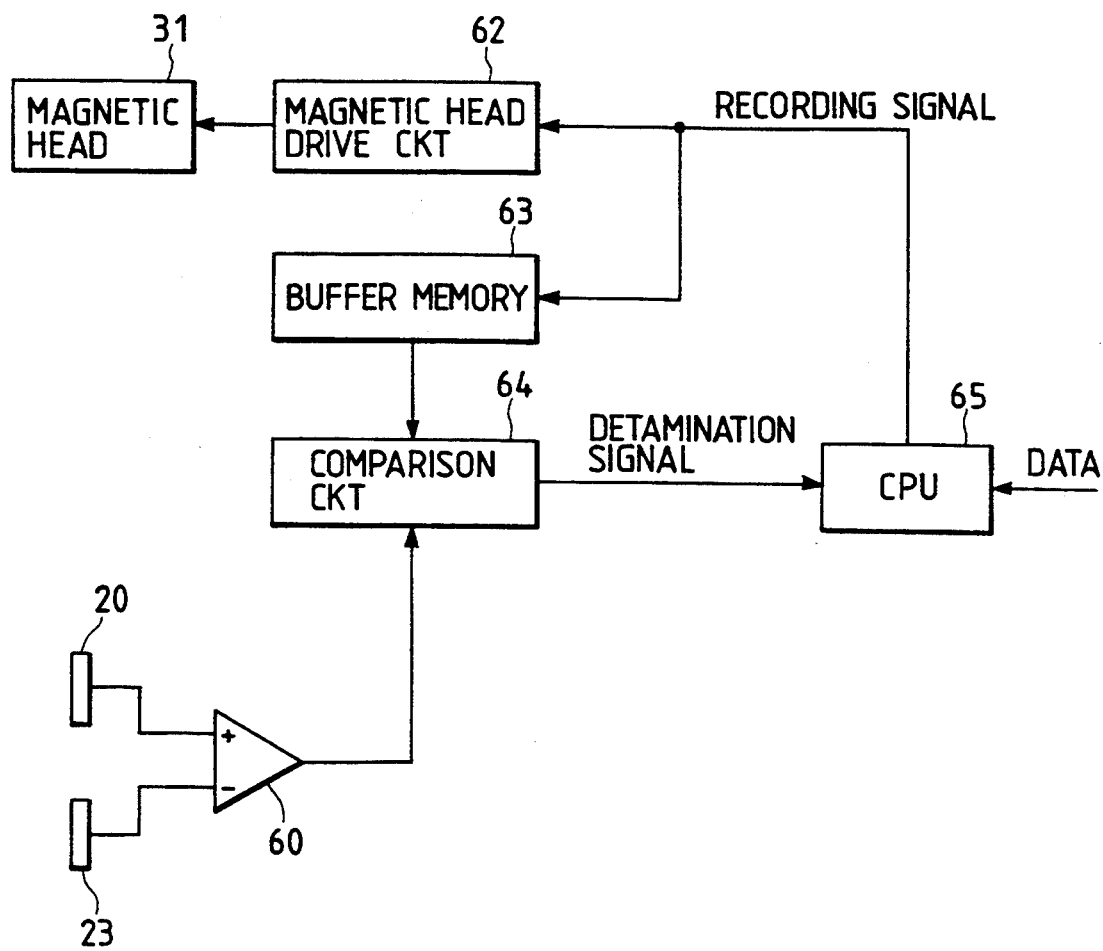
FIG. 9 is a block diagram showing a signal processing circuit used in the first embodiment.

FIG. 9 is a block diagram showing an arrangement of a signal processing circuit used in the optical information recording/reproduction apparatus shown in FIG. 3. In FIG. 9, data sent from an external apparatus such as a host computer is input to a central processing unit (CPU) 65, and is converted into a recording signal. The recording signal is input to a magnetic head drive circuit 62. The magnetic head drive circuit 62 reverses the direction of the magnetic field to be applied from the magnetic head 31 to the magnetooptical recording medium according to the recording signal. The recording signal is temporarily stored in a buffer memory 63 comprising, e.g., a semiconductor memory.

On the other hand, the output signals from the photoelectric conversion elements 20 and 23, which received the reflected light from the second light spot, are differentiated by a differential amplifier 60, thereby reproducing a signal recorded on the medium. The reproduced signal is sent to a comparison circuit 64, and is compared with the signal stored in the buffer memory 63. As a result of comparison, if the two signals coincide with each other, the comparison circuit 64 determines that recording is normally performed, and sends a determination signal indicating that to the CPU 65. In contrast to this, when the signal reproduced from the medium does not coincide with the recording signal, the comparison circuit 64 sends a determination signal indicating a non-coincidence to the CPU 65. Upon reception of the determination signal indicating the non-coincidence, the CPU 65 executes error processing, e.g., re-recording of a signal on another portion of the medium.

In this embodiment, since information is reproduced by the second reproduction optical system using the reflected light of the light spot 5-3 shifted backward from the recording central light spot 5-1, mixing of an old information component can be prevented, and a recorded information component can be reproduced with high precision. This reproduction signal is obtained not by detecting recorded information after a recording state is fixed but by reproducing a signal corresponding to the direction of magnetization of the reproduction layer 34 in a state wherein recording is about to be performed. When the obtained reproduction signal is compared with the recording information signal, whether or not an information domain having a correct direction of magnetization is being recorded in the reproduction layer 34 can be discriminated. Therefore, except for defects such as scratches or attached dust on the magnetooptical disk, a precise verify operation equivalent to that done after recording can be achieved. When a normal information reproduction mode is to be executed, the laser power of the semiconductor laser 1 is set to be a reproduction power, the light spots are scanned on the information track, and recorded information is reproduced by the first reproduction optical system using the reflected light of the light spot 5-1. More specifically, the output signals from the photoelectric conversion elements 13 and 16 of the first reproduction optical system are differentially detected by another differential amplifier, thereby generating a reproduction signal corresponding to the information domain on the information track. In this embodiment, since the size of the light spot 5-1 becomes smaller than that of a conventional light spot obtained without the optical filter 25, the recording/reproduction resolution of information can be improved, and the recording density can be increased. Furthermore, in this embodiment, since the recording light spot and the verify light spot are formed by changing the light intensity of the laser beam emitted from the semiconductor laser 1 by the optical filter 25, no complicated optical adjustment is required at all. Since the interval between the two light spots never becomes too large, one light spot can be prevented from forming an image outside the optical axis of the objective lens, and hence, quality of the reproduction signal can be guaranteed.

Figure 10:
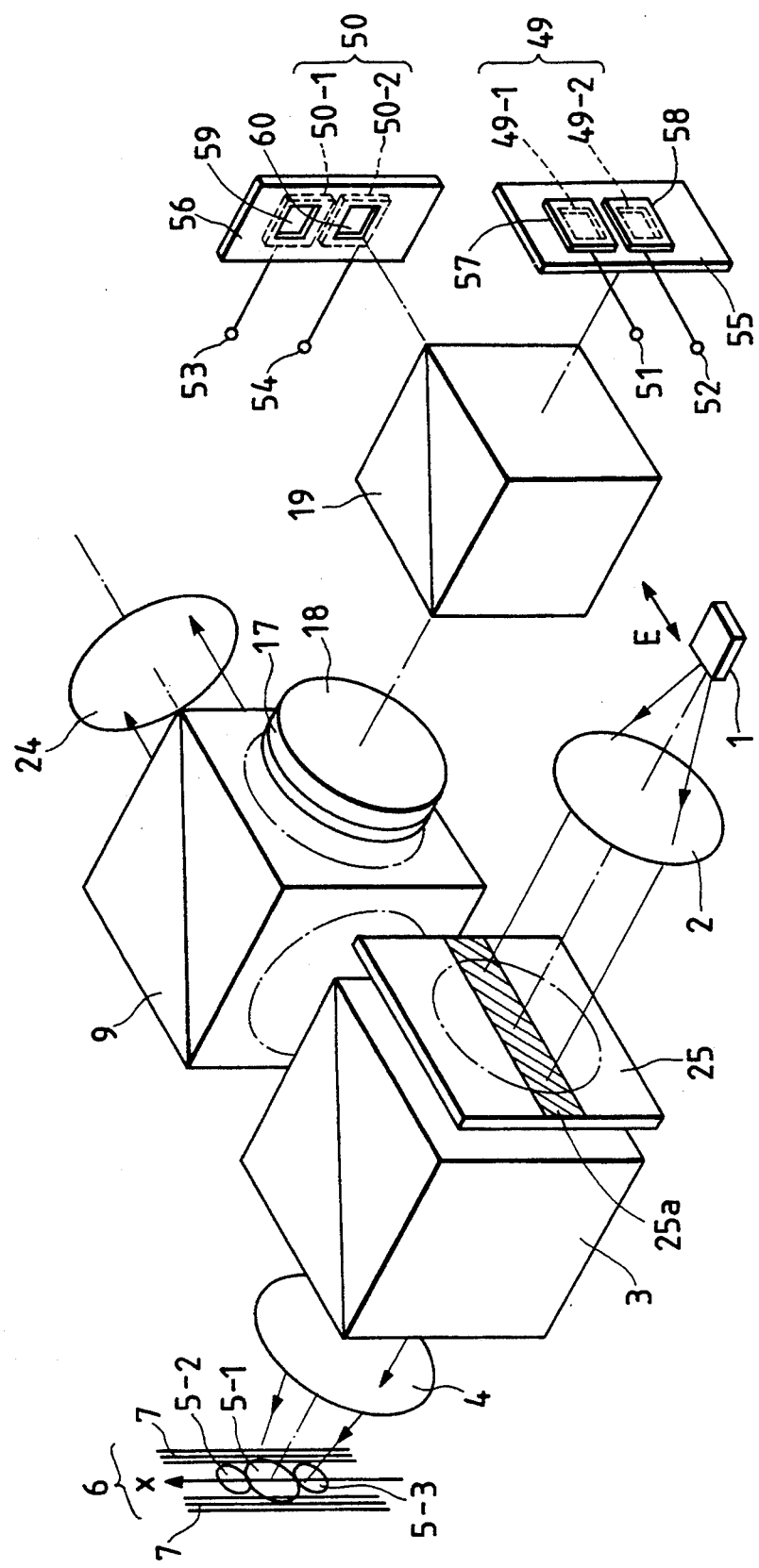
FIG. 10 is a schematic perspective view showing an optical information recording/reproduction apparatus according to the second embodiment of the present invention.

The second embodiment of the present invention will be described below with reference to FIG. 10. In the embodiment shown in FIG. 3, since the second reproduction optical system is added to obtain a verify reproduction signal, the structure of the optical system is complicated. This embodiment improves the construction shown in FIG. 3 to precisely perform the direct verify operation without complicating the structure of the optical system. Note that the same reference numerals in FIG. 10 denote the same parts as in FIG. 3. In FIG. 10, a photoelectric conversion element 49 is spatially divided into two detection elements 49-1 and 49-2, and a photoelectric conversion element 50 is similarly spatially divided into two detection elements 50-1 and 50-2. A light-shielding mask 55 for limiting an incident light beam is arranged on the front surface of the photoelectric conversion element 49, and also, a light-shielding mask 56 for limiting an incident light beam is arranged on the front surface of the photoelectric conversion element 50. The light-shielding mask 55 is formed with apertures 57 and 58 corresponding to the detection elements 49-1 and 49-2. The position of the aperture 57 is set to allow only the reflected light of the above-mentioned light spot 5-3 to pass therethrough. The position of the aperture 58 is set to allow only the reflected light of the light spot 5-1 to pass therethrough. Also, the light-shielding mask 56 is formed with apertures 59 and 60 corresponding to the detection elements 50-1 and 50-2. The position of the aperture 59 is set to allow only the reflected light of the light spot 5-3 to pass therethrough, and the position of the aperture 60 is set to allow only the reflected light of the light spot 5-1 to pass therethrough. Furthermore, the first reproduction optical system shown in FIG. 3 is not used since it is unnecessary.

In this embodiment, information is recorded on an information track upon irradiation of the light spots and application of a modulated magnetic field as in the embodiment shown in FIG. 3. In this case, information is recorded using the heating effect of the light spot 5-1. At this time, an output signal 51 from the detection element 49-1 of the photoelectric conversion element 49 and an output signal 53 from the detection element 50-1 of the photoelectric conversion element 50 are differentially detected by a differential amplifier, as shown in FIG. 9, and the obtained signal is output as a verify reproduction signal. Since the detection elements 49-1 and 50-1 detect only the reflected light of the light spot 5-3 due to the presence of the light-shielding masks 55 and 56, a precise reproduction signal of a recorded information component, which is mixed with less old information component, can be obtained as in the embodiment shown in FIG. 3. Therefore, the direct verify operation can be precisely performed as in the above embodiment. In a normal information reproduction mode, the laser power of the semiconductor laser is set to be a reproduction power, and a differential detection signal of an output signal 52 from the other detection element 49-2 of the photoelectric conversion element 49 and an output signal 54 from the other detection element 50-2 of the photoelectric conversion element 50 is output as a reproduction signal. Since the detection elements 49-2 and 50-2 detect only the reflected light of the light spot 5-1 due to the presence of the light-shielding masks 55 and 56, they can provide a functional equivalent to that of the first reproduction optical system shown in FIG. 3, and can reproduce recorded information. In this manner, according to this embodiment, two-divided photoelectric conversion elements are used, and are selectively used so that one set of divided elements are used for a verify operation, and the other set of divided elements are used for normal reproduction. Thus, a signal reproduction optical system can obtain two reproduction signals for verify and normal reproduction operations, and the structure of the optical system can be greatly simplified as compared to the embodiment shown in FIG. 3.

Figure 11:
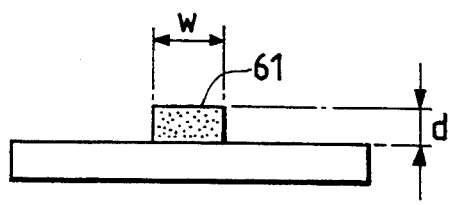
FIG. 11 is a schematic sectional view showing another construction of a super-resolution optical filter used in the present invention.

In each of the above embodiments, an amplitude type filter is exemplified as the optical filter 25. However, in order to improve light utilization efficiency, a phase type filter is preferable. When a phase type filter is used, the filter can be designed so that a light beam passing through a light-shielding portion of the filter has a phase difference of $\pi$ from a light beam transmitted through a portion other than the light-shielding portion. More specifically, as shown in FIG. 11, when the thickness of a phase difference portion 61 for providing a phase difference is represented by d, its refractive index is represented by n, and the wavelength of light is represented by $\lambda$, $d = \lambda/2(n-1)$ need only be satisfied. When a width W of the phase difference portion 61 is changed, the spot interval between the light spots 5-1 and 5-2, and the light amount ratio of the three light spots can be changed. Therefore, by changing the thickness d and the width W, a filter optimal for executing information recording and direct verify operations can be achieved. If a sufficient light amount is obtained, a filter consisting of both amplitude and phase type filters may be adopted. In this embodiment, the magnetic field modulation over-write type apparatus has been exemplified. The present invention can also be applied to an optical modulation over-write type apparatus. More specifically, in an optical modulation over-write system, the temperature of the reproduction layer becomes a very high temperature or a middle temperature lower than the very high temperature according to the intensity modulation of the light beam, and an information domain is recorded according to the temperature. Even in the optical modulation over-write system, a precise verify operation can be achieved as in the magnetic field modulation over-write system. In the above embodiments, a two-layered medium has been exemplified as the magnetooptical recording medium. However, the present invention is not limited to this. For example, a medium having a single-layered or three-layered structure may be satisfactorily used.

As described above, according to the present invention, a verify light spot is radiated behind a recording light spot, and recorded information is reproduced from reflected light of the verify light spot, thereby minimizing mixing of an old information component to a verify reproduction signal, and reproducing recorded information with high precision. Therefore, a precise direct verify operation can be executed, and reliability of recorded information can be improved. In addition, since the recording light spot and the verify light spot are formed by changing the intensity distribution of a light beam emitted from a single light source, no complicated optical adjustment is required at all, and the manufacture of the apparatus can be facilitated. Furthermore, since the recording light spot has a smaller size than that of a conventional light spot, the recording density can also be increased.

What is claimed is:

1. An optical information recording/reproduction apparatus comprising:
   a light source for emitting a light beam;
   a lens for converging the light beam emitted from said light source onto a track provided on an optical recording medium, which is moved relative to the light beam;
   a super-resolution optical filter, arranged in an optical path extending from said light source to the medium, for forming, from the light beam, a first light spot irradiated onto the track, and a second light spot, which is formed to be juxtaposed with the first light spot in a longitudinal direction of the track and has an intensity lower than an intensity of the first light spot, a signal being recorded on the track by the first light spot;
   a heated area of high temperature at a position shifted from a position at which the first light spot is irradiated on the optical recording medium by relative movement between the light beam and the optical recording medium, wherein the second light spot is positioned within the heated area; and
   reproduction means for reproducing the signal recorded on the track using the first light spot, from reflected light of the second light spot by said medium.

2. An apparatus according to claim 1, wherein said super-resolution optical filter forms a first light spot consisting of a super-resolution light spot, and second and third light spots, which are arranged at two sides of the first light spot in the longitudinal direction of the track and are defined by side lobe light components each having a predetermined phase difference from the first light spot.

3. An apparatus according to claim 1, wherein said reproduction means comprises a photodetector for detecting reflected light of the second light spot by said medium, and a mask for shielding reflected light of the first light spot by said medium so as not to cause the light to be incident on said photodetector.

4. An apparatus according to claim 1, wherein said medium comprises a magnetooptical recording medium, and said apparatus further comprises a magnetic head for applying a magnetic field modulated according to a signal onto a portion, irradiated with the first light spot, of said medium.

5. An apparatus according to claim 4, further comprising:
- a magnetic head drive circuit for driving said magnetic head according to a recording signal;
- a buffer memory for storing the recording signal; and
- a comparison circuit for comparing a signal reproduced by said reproduction means with the recording signal stored in said buffer memory.

6. An apparatus according to claim 4, wherein said reproduction means comprises a photodetector for receiving reflected light of the second light spot by said medium, and an analyzer arranged in an optical path extending from said medium to said photodetector.

7. An apparatus according to claim 6, wherein said reproduction means comprises a half-wave plate for rotating a direction of polarization of reflected light of the second light spot by said medium through 45°, a polarizing beam splitter for splitting the reflected light transmitted through said half-wave plate into p-polarized light and s-polarized light, first and second photodetectors for respectively receiving the split p-polarized light and s-polarized light, and means for differentiating output signals from said first and second photodetectors.

8. An apparatus according to claim 1, wherein said super-resolution optical filter comprises an optical filter provided with a band-like light-shielding portion extending in a direction perpendicular to the longitudinal direction of the track.

9. An apparatus according to claim 1, wherein said super-resolution optical filter comprises an optical filter provided with a band-like phase difference portion extending in a direction perpendicular to the longitudinal direction of the track.

10. A method for performing recording and reproduction using an apparatus, which comprises a light source for emitting a light beam, a lens for converging the light beam emitted from said light source onto a track provided on an optical recording medium, a super-resolution optical filter, arranged in an optical path extending from said light source to said medium, for forming, from the light beam, a first light spot irradiated onto the track, and a second light spot, which is formed to be juxtaposed with the first light spot in a longitudinal direction of the track and has an intensity lower than an intensity of the first light spot, a magnetic head, a heated area of high temperature at a position shifted from a position at which the first light spot is irradiated on the optical recording medium by relative movement between the light beam and the optical recording medium, wherein the second light spot is positioned within the heated area, and a photodetector for detecting reflected light of the second light spot by said medium, comprising the steps of:
- moving the first and second spots relative to said medium in the longitudinal direction of the track;
- recording a signal on the track by applying a magnetic field modulated according to a recording signal by said magnetic head onto a portion, irradiated with the first light spot, of said medium; and
- reproducing the signal recorded on the track using the first light spot, from an output from said photodetector.

11. A method according to claim 10, further comprising the step of verifying the signal recorded on the track by comparing the reproduced signal and the recording signal.

12. A magnetooptical information recording/reproduction apparatus comprising:
- a light source for emitting a light beam;
- a lens for converging the light beam emitted from said light source onto a track provided on an optical recording medium, which is moved relative to the light beam;
- a super-resolution optical filter, arranged in an optical path extending from said light source to said medium, for forming, from the light beam, a first light spot irradiated onto the track, and a second light spot, which is formed to be juxtaposed with the first light spot in a longitudinal direction of the track and has an intensity lower than an intensity of the first light spot;
- a magnetic head for applying a magnetic field modulated according to a recording signal onto a portion, irradiated with the first light spot, of said medium;
- a heated area of high temperature at a position shifted from a position at which the first light spot is irradiated on the optical recording medium by relative movement between the light beam and the optical recording medium, wherein the second light spot is positioned within the heated area; and
- reproduction means for reproducing the recording signal recorded on the track using the first light spot, from reflected light on the second light spot by said medium.

13. An apparatus according to claim 12, wherein said super-resolution optical filter forms a first light spot consisting of a super-resolution light spot, and second and third light spots, which are arranged at two sides of the first light spot in the longitudinal direction of the track and are defined by side lobe light components each having a predetermined phase difference from the first light spot.

14. An apparatus according to claim 12, further comprising:
- a magnetic head drive circuit for driving said magnetic head according to the recording signal;
- a buffer memory for storing the recording signal; and
- a comparison circuit for comparing a signal reproduced by said reproduction means with the recording signal stored in said buffer memory.

15. An apparatus according to claim 12, wherein said reproduction means comprises a photodetector for receiving reflected light of the second light spot by said medium, and an analyzer arranged in an optical path extending from said medium to said photodetector.

16. An apparatus according to claim 15, wherein said reproduction means comprises a half-wave plate for rotating a direction of polarization of reflected light of the second light spot by said medium through 45°, a polarizing beam splitter for splitting the reflected light transmitted through said half-wave plate into p-polarized light and s-polarized light, first and second photodetectors for respectively receiving the split p-polarized light and s-polarized light, and means for differentiating output signals from said first and second photodetectors.

17. An apparatus according to claim 12, wherein said super-resolution optical filter comprises an optical filter provided with a band-like light-shielding portion extending in a direction perpendicular to the longitudinal direction of the track.

18. An apparatus according to claim 12, wherein said super-resolution optical filter comprises an optical filter provided with a band-like phase difference portion extending in a direction perpendicular to the longitudinal direction of the track.

19. A magnetooptical information recording/reproduction apparatus comprising:
   a light source for emitting a light beam;
   a lens for converging the light beam emitted from said light source onto a track provided on an optical recording medium, which is moved relative to the light beam;
   a super-resolution optical filter, arranged in an optical path extending from said light source to said medium, for forming, from the light beam, a first light spot irradiated onto the track, and a second light spot, which is formed to be juxtaposed with the first light spot in a longitudinal direction of the track and has an intensity lower than an intensity of the first light spot;
   a magnetic head for applying a magnetic field modulated according to a recording signal onto a portion, irradiated with the first light spot, of said medium;
   a beam splitter for splitting reflected light components of the first and second light spots by said medium into first and second light beams;
   first photodetection means for receiving the first light beam;
   a first mask, arranged in an optical path extending from said beam splitter to said first photodetection means, for shielding reflected light of the second light spot so as not to cause the light to be incident on said first photodetection means;
   second photodetection means for receiving the second light beam; and
   a second mask, arranged in an optical path extending from said beam splitter to said second photodetection means, for shielding reflected light of the first light spot so as not to cause the light to be incident on said second photodetection means.

20. An apparatus according to claim 19, wherein said super-resolution optical filter forms a first light spot consisting of a super-resolution light spot, and second and third light spots, which are arranged at two sides of the first light spot in the longitudinal direction of the track and are defined by side lobe light components each having a predetermined phase difference from the first light spot.

21. An apparatus according to claim 19, further comprising:
   a magnetic head drive circuit for driving said magnetic head according to the recording signal;
   a buffer memory for storing the recording signal;
   a reproduction circuit for reproducing the recording signal recorded on the track using the first light spot from an output from said second photodetection means; and
   a comparison circuit for comparing a signal reproduced by said reproduction means with the recording signal stored in said buffer memory.

22. An apparatus according to claim 19, wherein said first photodetection means comprises a first half-wave plate for rotating a direction of polarization of the first light beam through 45°, a first polarizing beam splitter for splitting the light beam transmitted through said first half-wave plate into p-polarized light and s-polarized light, and first and second photodetectors for respectively receiving the p-polarized light and s-polarized light split by said first polarizing beam splitter, and said second photodetection means comprises a second half-wave plate for rotating a direction of polarization of the second light beam through 45°, a second polarizing beam splitter for splitting the light beam transmitted through said second half-wave plate into p-polarized light and s-polarized light, and third and fourth photodetectors for respectively receiving the p-polarized light and s-polarized light split by said second polarizing beam splitter.

23. An apparatus according to claim 19, wherein said super-resolution optical filter comprises an optical filter provided with a band-like light-shielding portion extending in a direction perpendicular to the longitudinal direction of the track.

24. An apparatus according to claim 19, wherein said super-resolution optical filter comprises an optical filter provided with a band-like phase difference portion extending in a direction perpendicular to the longitudinal direction of the track.

25. A magnetooptical information recording/reproduction apparatus comprising:
   a light source for emitting a light beam;
   a lens for converging the light beam emitted from said light source onto a track provided on an optical recording medium, which is moved relative to the light beam;
   a super-resolution optical filter, arranged in an optical path extending from said light source to said medium, for forming, from the light beam, a first light spot irradiated onto the track, and a second light spot, which is formed to be juxtaposed with the first light spot in a longitudinal direction of the track and has an intensity lower than an intensity of the first light spot;
   a magnetic head for applying a magnetic field modulated according to a recording signal onto a portion, irradiated with the first light spot, of said medium;
   a heated area of high temperature at a position shifted from a position at which the first light spot is irradiated on the optical recording medium by relative movement between the light beam and the optical recording medium, wherein the second light spot is positioned within the heated area; and
   first and second photodetection means for respectively receiving reflected light components of the first and second light spots by said medium.

26. An apparatus according to claim 25, wherein said super-resolution optical filter forms a first light spot consisting of a super-resolution light spot, and second and third light spots, which are arranged at two sides of the first light spot in the longitudinal direction of the track and are defined by side lobe light components each having a predetermined phase difference from the first light spot.

27. An apparatus according to claim 25, further comprising:
   a magnetic head drive circuit for driving said magnetic head according to the recording signal;

a buffer memory for storing the recording signal;

a reproduction circuit for reproducing the recording signal recorded on the track by the first light spot from an output from said second photodetection means; and a comparison circuit for comparing a signal reproduced by said reproduction means with the recording signal stored in said buffer memory.

28. An apparatus according to claim 25, further comprising masks, respectively arranged in optical paths extending from said medium to said first and second photodetection means, for shielding the reflected light of the second light spot so as not to cause the light to be incident on said first photodetection means, and for shielding the reflected light of the first light spot so as not to cause the light to be incident on said second photodetection means.

29. An apparatus according to claim 25, wherein said first and second photodetection means comprise a half-wave plate for rotating a direction of polarization of light reflected by said medium through 45°, a polarizing beam splitter for splitting the light beam transmitted through said half-wave plate into p-polarized light and s-polarized light, a first photodetector for receiving reflected light of the first light spot of the p-polarized light split by said polarizing beam splitter, a second photodetector for receiving reflected light of the second light spot of the p-polarized light, a third photodetector for receiving reflected light of the first light spot of the s-polarized light split by said polarizing beam splitter, and a fourth photodetector for receiving reflected light of the second light spot of the s-polarized light.

30. An apparatus according to claim 25, wherein said super-resolution optical filter comprises an optical filter provided with a band-like light-shielding portion extending in a direction perpendicular to the longitudinal direction of the track.

31. An apparatus according to claim 25, wherein said super-resolution optical filter comprises an optical filter provided with a band-like phase difference portion extending in a direction perpendicular to the longitudinal direction of the track.

32. A method of forming a plurality of light spots on an optical recording medium, said method comprising the steps of:

generating a light beam from a light source;

providing a super-resolution optical filter in an optical path from the light source to the optical recording medium and forming on the optical recording medium a first light spot and a second light spot having an intensity lower than that of the first light spot;

effecting relative movement between the light beam and the optical recording medium;

causing a part of an area of the optical recording medium to be heated to a high temperature at a position shifted from the position at which the first light spot is irradiated on the optical recording medium by said relative movement; and arranging the second light spot within the heated area of the optical recording medium.

33. A method according to claim 32 further comprising the step of reproducing a signal recorded on the optical recording medium, by using the second light spot.

* * * * *

UNITED STATES PATENT AND TRADEMARK OFFICE
CERTIFICATE OF CORRECTION

PATENT NO. : 5,450,376
DATED : September 12, 1995
INVENTOR(S) : Matsumura et al.

It is certified that error appears in the above-indentified patent and that said Letters Patent is hereby corrected as shown below:

SHEET 6 OF THE DRAWINGS:

"DETAMINATION" should read --DETERMINATION--.

COLUMN 6:

Line 38, "representing" should read --represents--.

COLUMN 7:

Line 54, "of-the" should read --of the--.

Signed and Sealed this

Twenty-seventh Day of February, 1996

Attest:

BRUCE LEHMAN

*Attesting Officer*        *Commissioner of Patents and Trademarks*